(12) United States Patent
Perry et al.

(10) Patent No.: US 8,321,426 B2
(45) Date of Patent: Nov. 27, 2012

(54) ELECTRONICALLY LINKING AND RATING TEXT FRAGMENTS

(75) Inventors: Russell Perry, Bristol (GB); Arnau Panosa, Barcelona (ES); Galo Gimenez, Bigues I Riells (ES); Jaime Ayats, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 12/771,073

(22) Filed: Apr. 30, 2010

(65) Prior Publication Data

US 2011/0270846 A1    Nov. 3, 2011

(51) Int. Cl.
*G06F 17/00* (2006.01)
(52) U.S. Cl. .......................... 707/748; 707/769; 707/636
(58) Field of Classification Search .................. 707/769, 707/649, 636
See application file for complete search history.

(56) References Cited

U.S. PATENT DOCUMENTS

| | | | |
|---|---|---|---|
| 5,778,398 A | 7/1998 | Nagashima et al. | |
| 2004/0085354 A1 | 5/2004 | Massand | |
| 2005/0060643 A1 | 3/2005 | Glass et al. | |
| 2006/0242631 A1* | 10/2006 | Andersen et al. | 717/137 |
| 2006/0287971 A1 | 12/2006 | Armstrong | |
| 2007/0011608 A1 | 1/2007 | Titemore et al. | |
| 2008/0028300 A1 | 1/2008 | Krieger et al. | |
| 2009/0260060 A1 | 10/2009 | Smith et al. | |

FOREIGN PATENT DOCUMENTS

JP    2008027215 A    2/2008

OTHER PUBLICATIONS

Clough, Paul D.; "Measuring Text Reuse and Document Derivation"; Postgraduate Transfer Report; Department of Computer Science; Abstract; Feb. 2001; (pp. 1-64).

* cited by examiner

*Primary Examiner* — Belix M Ortiz Ditren
(74) *Attorney, Agent, or Firm* — Garry A. Perry (57) ABSTRACT

In one embodiment, a first text fragment is made available for copying from a fragment repository. The first text fragment is electronically linked to a second text fragment that is a copy of the first text fragment, the second text fragment included in a container external to the fragment repository. A rating is provided for a derivative of the second fragment created within the container. A third text fragment that is a derivative of the second text fragment is received at the fragment repository. The first and third text fragments are electronically linked, and the third text fragment is made available for copying.

20 Claims, 7 Drawing Sheets

ELECTRONICALLY LINKING AND RATING TEXT FRAGMENTS

BACKGROUND

In many publishing and authoring environments it is desirable to ensure consistency in a message across a set of documents. For example, in a marketing environment it may be beneficial to maintain a uniform marketing message across a large suite of documents used in a marketing campaign.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Maintaining consistency in message across a large set of documents can be improved by utilizing common text fragments within the documents. However, it will often be necessary to allow multiple document authors customize the documents and text fragments. For example, it may be necessary for an author of marketing documents within a campaign to customize the documents and text fragments for viewing within a particular geography, by particular audiences, etc. Customizing text fragments without effective safeguards can result in the sending of inconsistent and/or inaccurate messages. Further, through copying of inconsistent and/or inaccurate text fragments by other users, a mistake made in one document may be reproduced in many documents. Embodiments described below were developed in an effort to provide for the sharing, customization, and rating of electronically linked text fragments by multiple authors while ensuring consistency between versions.

The following description is broken into sections. The first, labeled "Environment", describes an example environment in which embodiments may be implemented. The second section, labeled "Components", describes various physical and logical components utilized to implement various embodiments. The third section, labeled as "Operation", describes various steps taken to implement various embodiments. The fourth section, labeled "Example", describes an example of making available, electronically linking, receiving, and rating text fragments utilizing a fragment repository and a container.

Figure 1:
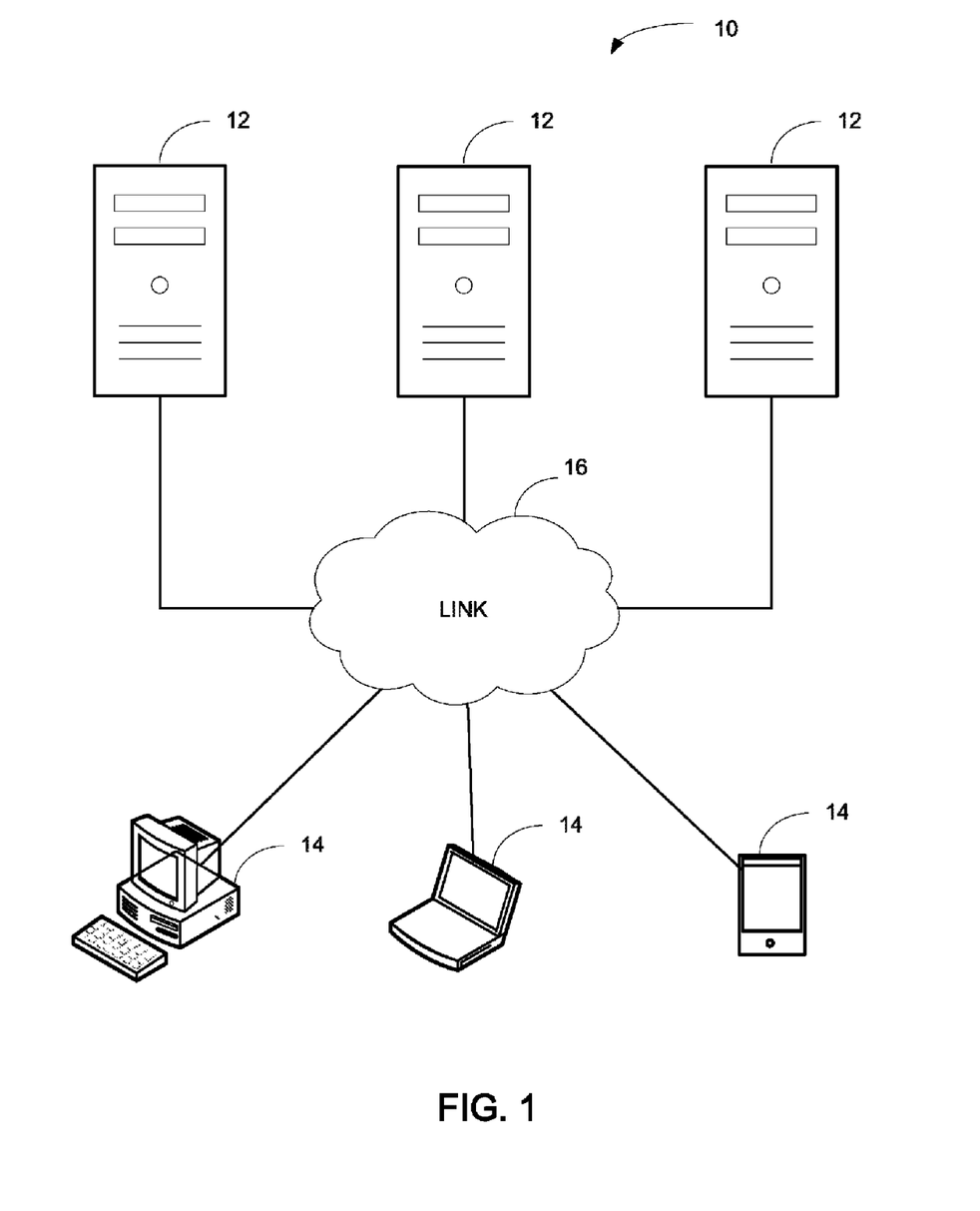
FIG. 1 depicts an example environment in which various embodiments may be implemented.

Environment: FIG. 1 depicts an example environment 10 in which various embodiments may be implemented. Environment 10 is shown to include servers 12 and clients 14 interconnected via link 16.

Servers 12 represent generally any computing device capable of serving content to, and receiving content from, a client 14 via link 16. The term content refers to visual and audible information that can be presented to and received from a user of a client 14. Examples include text, still, images, audio, and video. Content can also include instructions designed to be processed by a client 14. Examples include HTML code and various scripts. As discussed with reference to FIG. 4 below, servers 12 may include web servers designed to serve text fragment content to clients 14. In an example, servers 12 may be utilized by an enterprise to host web pages and run applications that facilitate text fragment sharing via an editor.

Each client 14 represents generally any computing device capable of requesting content from, and sending content to, servers 12 via a link 16. Clients 14 are also responsible for receiving and processing responses to requests for content. As used in this specification and the appended claims, "processing" includes executing instructions in memory to perform some transformation and/or computation on data in the computing device's memory. Processing may include displaying visual content such as text, images, and motion video on a monitor as well as broadcasting audio content via one or more speakers. Example clients include desktop computers, laptop computers, smart phones, cell phones, personal digital assistants, net-books, digital media players, and the like.

Link 16 represents generally one or more of a cable, wireless, fiber optic, or remote connection via a telecommunication link, an infrared link, a radio frequency link, or any other connector or system that provides electronic communication. Link 16 may represent an intranet, the internet, or a combination of both. The paths followed by link 16 between servers 12 and clients 14 as depicted in FIG. 1 represent the logical communication paths between these devices, not necessarily the physical paths between the devices.

Figure 2:
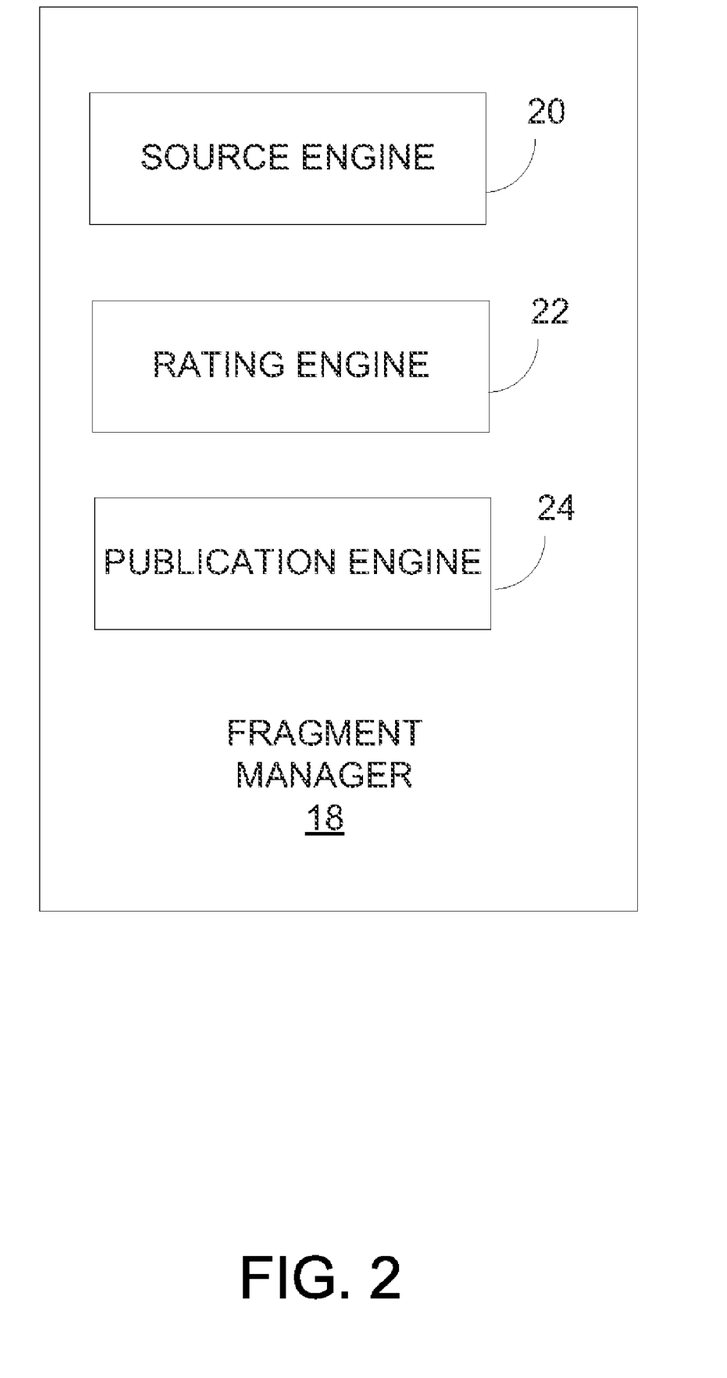
FIG. 2 depicts an example of a fragment manager according to an embodiment.

Components: FIG. 2 depicts an example of a fragment manager 18. Fragment manager 18 represents generally any combination of hardware and programming configured for use in making available, receiving and rating electronically linked text fragments utilizing a fragment repository and a container. In the example of FIG. 2, fragment manager 18 is shown to include a source engine 20, a rating engine 22 and a publication engine 24.

Source engine 20 represents generally any combination of hardware and programming configured to make available for copying from a fragment repository a first text fragment. As used in this specification and the appended claims, a "text fragment" includes a string of characters without formatting. "Characters" include marks or symbols, such as letters or numbers that are arranged to express information. As used in this specification and the appended claims, a "fragment repository" includes a depository for holding text fragments. In an embodiment, the fragment repository may comprise a computing device, server or storage device. In an embodiment the fragment repository comprises a memory and text fragments are stored in memory. In an embodiment, the first text fragment is an original or source fragment that is approved by an administrator or otherwise certified as a permissible or recommended text fragment. In an embodiment the source engine is additionally operable to search for text fragments within the fragment repository.

Source engine 20 is additionally configured to electronically link the first text fragment to a second text fragment that is a copy of the first text fragment, the second text fragment included in a container external to the fragment repository. As used in this specification and the appended claims, to "electronically link" includes creating a connection or linkage between text fragments by virtue of a reference to a location in computer memory. An electronic link may include a pointer or other data type whose value refers to another value stored elsewhere in the computer memory using its address. In an embodiment, an electronic link may be used to traverse a string, lookup table, control table and/or a tree structure. In an embodiment, electronically linking text fragments includes assigning a hash code to link the text fragments. As used in this specification and the appended claims, a "hash code" includes a value or code that is used by a procedure or mathematical function to convert a variable sized amount of data into smaller datum. In an embodiment, the hash code may be a single integer that serves as an index to an array.

As used in this specification and the appended claims, a "container" includes any article or object configured to hold a text fragment. In an embodiment, a container may include a class, a data structure, or an abstract data type (ADT) whose instances are collections of objects. In an embodiment, a container includes an electronic document. As used in this specification and the appended claims, an "electronic document" includes electronic media content other than computer programs or system files that are intended to be used in either an electronic form or as printed output. Examples of electronic documents include, but are not limited to documents in file formats associated with various proprietary word processors, spreadsheets and graphics software, such as .doc (Microsoft Word), .xls (Microsoft Excel), and .ppt (Microsoft PowerPoint). Examples of standardized non-proprietary file formats include .pdf, HTML, and .xml.

In an embodiment, a container includes an editor. As used in this specification and the appended claims, an "editor" represents generally programming configured for use in the editing of text. In embodiments, an editor includes software used for the composition, editing, and/or formatting of an electronic document. In an embodiment an editor utilizes a graphical user interface to provide for "What You See Is What You Get" editing of text and/or an electronic document. Examples of editors include Microsoft Word®, Microsoft Notepad®, Corel WordPerfect®, and Google Docs®. In an embodiment, a container includes an electronic document that is open for editing in an editor.

Rating engine 22 represents generally any combination of hardware and programming configured to provide a rating for a derivative of the second text fragment created within the container. As used in this specification and the appended claims, a "derivative" of a text fragment includes a text fragment that is formed or developed as the result of the making of a modification to an existing text fragment. A user may utilize a keyboard or other interface and an editor to modify or edit the second text fragment, thereby creating a third text fragment that is a derivative of the first and second text fragments.

In an embodiment a software application that compares text fragments and issues a consistency score based on similarities between the text fragments can be used to provide a rating to show a degree of consistency between the derivative text fragment and a related text fragment. As used in this specification and the appended claims, a "related text fragment" includes a text fragment from which the derivative text fragment derived and any other derivatives of that text fragment. In an embodiment, the related text fragment is displayed within the container. In an embodiment, the rating shows a degree of consistency between the derivative text fragment and the first text fragment. In an embodiment, the rating shows a degree of consistency between the derivative text fragment and the second text fragment. In an embodiment, the rating shows a degree of consistency between the derivative text fragment and a related text fragment that is created in a separate editing session. As used in this specification and the appended claims, a "separate editing session" includes an editing session that is distinct from the current editing session. A separate editing session may be a prior editing session that involved the same user as is involved in the current editing session. A separate editing session may be a prior or concurrent editing session that does not involve the user as that is involved in the current editing session. In an embodiment, a first user is provided with a notice or warning if a related text fragment is revised by a second user in a contemporaneous editing session.

Publication engine 24 represents generally any combination of hardware and programming configured to receive at the fragment repository a third text fragment that is a derivative of the second text fragment, electronically link the first and third text fragments, and make the third text fragment available for copying. In an example, the third text fragment may be received at the fragment repository from an electronic document. In example, the third text fragment may be received at the fragment repository from an editor application. In example, the third text fragment may be received at the fragment repository from an electronic document open in an editor. In an embodiment, formatting is removed and the third text fragment is converted into a canonical form before it is received at the fragment repository. In an embodiment, the third text fragment meets a rating threshold in order to be made available for copying. In an example, derivative text fragments with a rating showing at least a 75% degree of consistency with a source fragment are made available for copying by users.

Figure 3:
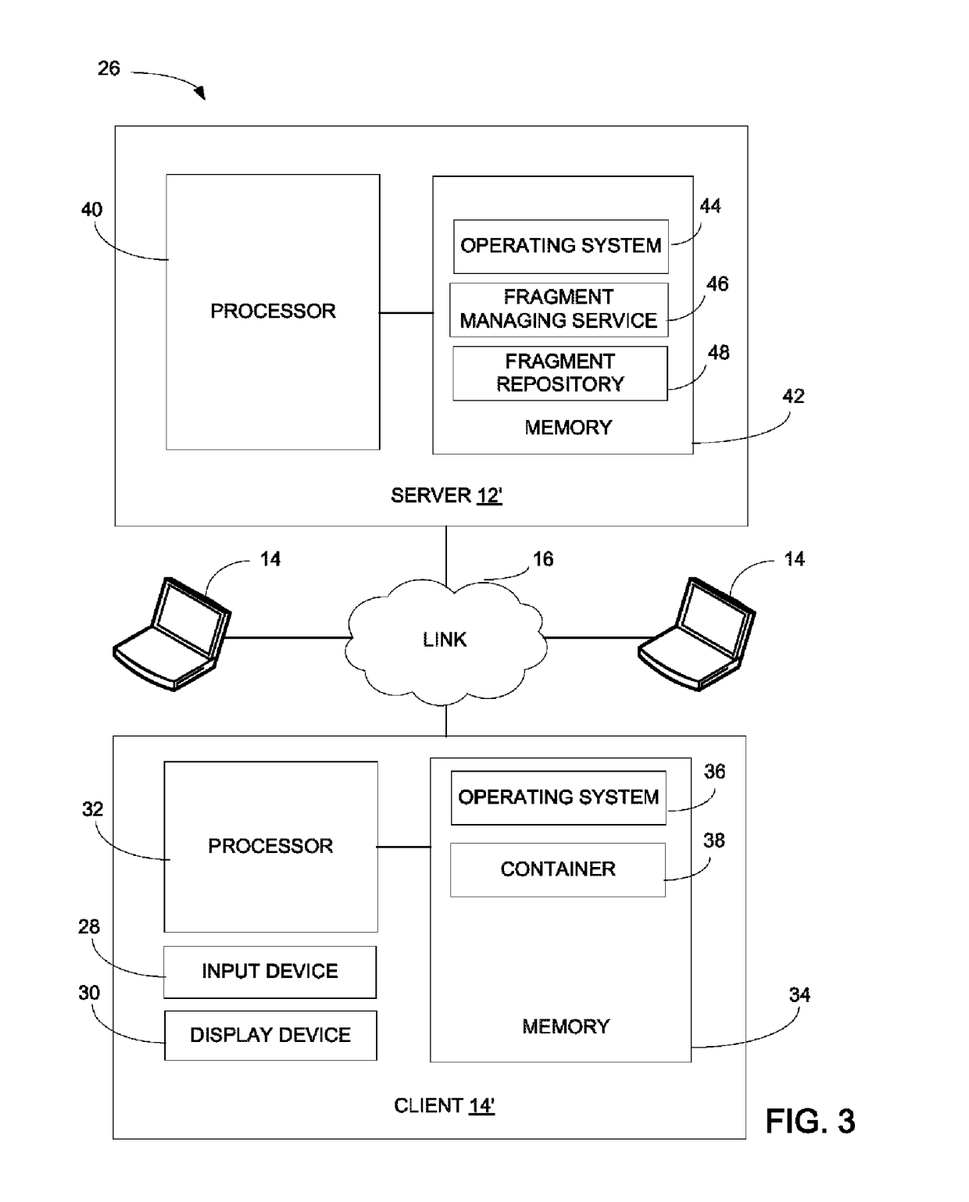
FIGS. 3-4 depict implementations of the fragment manager of FIG. 2.

Fragment manager 18 may be implemented in a number of environments, such as environment 26 of FIG. 3. Environment 26 includes client 14', server 12', and clients 14 interconnected via link 16.

Client 14' is shown to include an input device 28, a display device 30, a processor 32 and a memory 34. Memory 34, in this example, is shown to include operating system 36 and container 38. Operating system 36 represents generally any software platform on top of which other programs or applications such as the container 38 run. Examples include Linux® and Microsoft Windows®. In this example, operating system 32 includes drivers for controlling the operation of components 28 and 30. In particular, these drivers translate generic commands into device specific commands capable of being utilized by components 28 and 30. Container 38 represents generally any programming that, when executed by processor 32, allows for the composition, editing and/or formatting of text and/or an electronic document and is configured to hold a text fragment.

Server 12' is shown to include a processor 40 and a memory 42. Processor 40 represents generally any device capable of executing program instructions stored in memory 42. Memory 42 represents generally any memory configured to store program instructions and other data. Memory 42 is shown to include an operating system 44, a fragment managing service 46 and a fragment repository 48. Operating system 44 represents generally any software platform on top of which other programs or applications such as the fragment managing service 46 run. Examples include Linux® and Microsoft Windows®.

Clients 14 represent generally any computing devices that receive and process responses to requests for content, including text fragments. In this example clients 14 include laptop computers.

Fragment managing service 46 in combination with fragment repository 48 and container 38 represent generally any programming that, when executed, implements the functionality of the fragment manager 18 of FIG. 2. In particular, fragment managing service 46, when executed by processor 40, is responsible for making available for copying from the fragment repository 48 a first text fragment. The first text fragment is electronically linked to a second text fragment that is a copy of the first text fragment and is included in the container 38 external to the fragment repository 48. A rating is provided for a derivative of the second text fragment created within the container 38. In an embodiment a software application that compares text fragments and issues a consistency score may be used to provide a rating of the consistency between the derivative text fragment and a related text fragment. In an embodiment, the rating shows a degree of consistency between the derivative text fragment and the first text fragment. In an embodiment, the rating shows a degree of consistency between the derivative text fragment and the second text fragment. In an embodiment, the rating shows a degree of consistency between the derivative text fragment and a related text fragment that is created in an editing session occurring at one of the clients 14 separate from client 14'. A third text fragment that is a derivative of the second text fragment is received at the fragment repository 48. The first and third text fragments are electronically linked, and the third text fragment is made available for copying.

Figure 4:
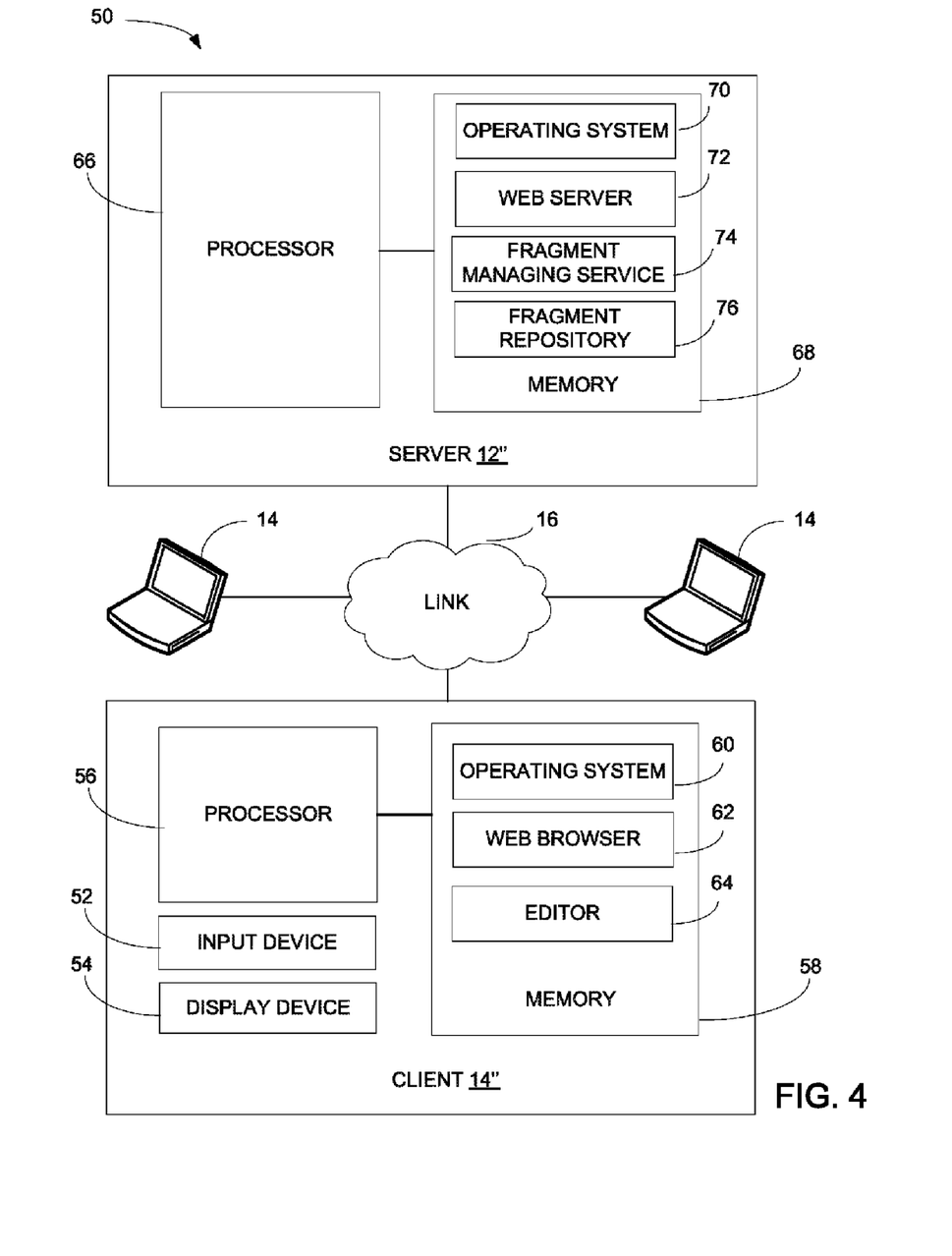

Fragment manager 18 may also be implemented in an environment such as environment 50 of FIG. 4. Environment 50 includes a client 14", a server 12" and clients 14 interconnected via link 16.

Client 14" is shown to include an input device 52, a display device 54, a processor 56 and a memory 58. Memory 58, in this example, is shown to include operating system 60, web browser 62, and editor 64. Operating system 60 represents generally any software platform on top of which other programs or applications such as the editor 64 run. Examples include Linux® and Microsoft Windows®. In this example, operating system 60 includes drivers for controlling the operation of components 52 and 54. In particular, these drivers translate generic commands into device specific commands capable of being utilized by components 52 and 54. Web browser 62 represents generally any programming that, when executed by processor 56, requests and causes a display of content served by server 12". Web browser 62 is also responsible for communicating data indicative of user input back to server 12". Editor 64 represents generally any programming that, when executed by processor 56, allows for the composition, editing and/or formatting of text and/or an electronic document and is configured to hold a text fragment.

Server 12" is shown to include processor 66 and a memory 68. Processor 66 represents generally any device capable of executing program instructions stored in memory 68. Memory 68 represents generally any memory configured to store program instructions and other data. Memory 68 is shown to include operating system 70, a web server 72, a fragment managing service 74 and a fragment repository 76. Operating system 70 represents generally any software platform on top of which other programs or applications such as the web server 72, fragment managing service 74 and fragment repository 76 run. Examples include Linux® and Microsoft Windows®.

Clients 14 represent generally computing devices that receive and process responses to requests for content, including text fragments. In this example clients 14 are laptop computers.

Fragment managing service 74 in combination with web server 72, fragment repository 76 and editor 64 represent generally any programming that, when executed, implements the functionality of the fragment manager 18 of FIG. 2. In particular, fragment managing service 74, when executed by processor 66, is responsible for making available for copying from the fragment repository 76 a first text fragment. The first text fragment is electronically linked to a second text fragment that is a copy of the first text fragment and is included in the editor 64 external to the fragment repository 76. A rating is provided for a derivative of a second text fragment created within the editor 64. In an embodiment a software application that compares text fragments and issues a consistency score that may be used to provide a rating of the consistency between the derivative text fragment and a related text fragment. In an embodiment, the rating shows a degree of consistency between the derivative text fragment and the first text fragment. In an embodiment, the rating shows a degree of consistency between the derivative text fragment and the second text fragment. In an embodiment, the rating shows a degree of consistency between the derivative text fragment and a related text fragment that is created in an editing session occurring at one of the clients 14 separate from client 14". A third text fragment that is a derivative of the second text fragment is received at the fragment repository 76. The first and third text fragments are electronically linked, and the third text fragment is made available for copying.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 5:
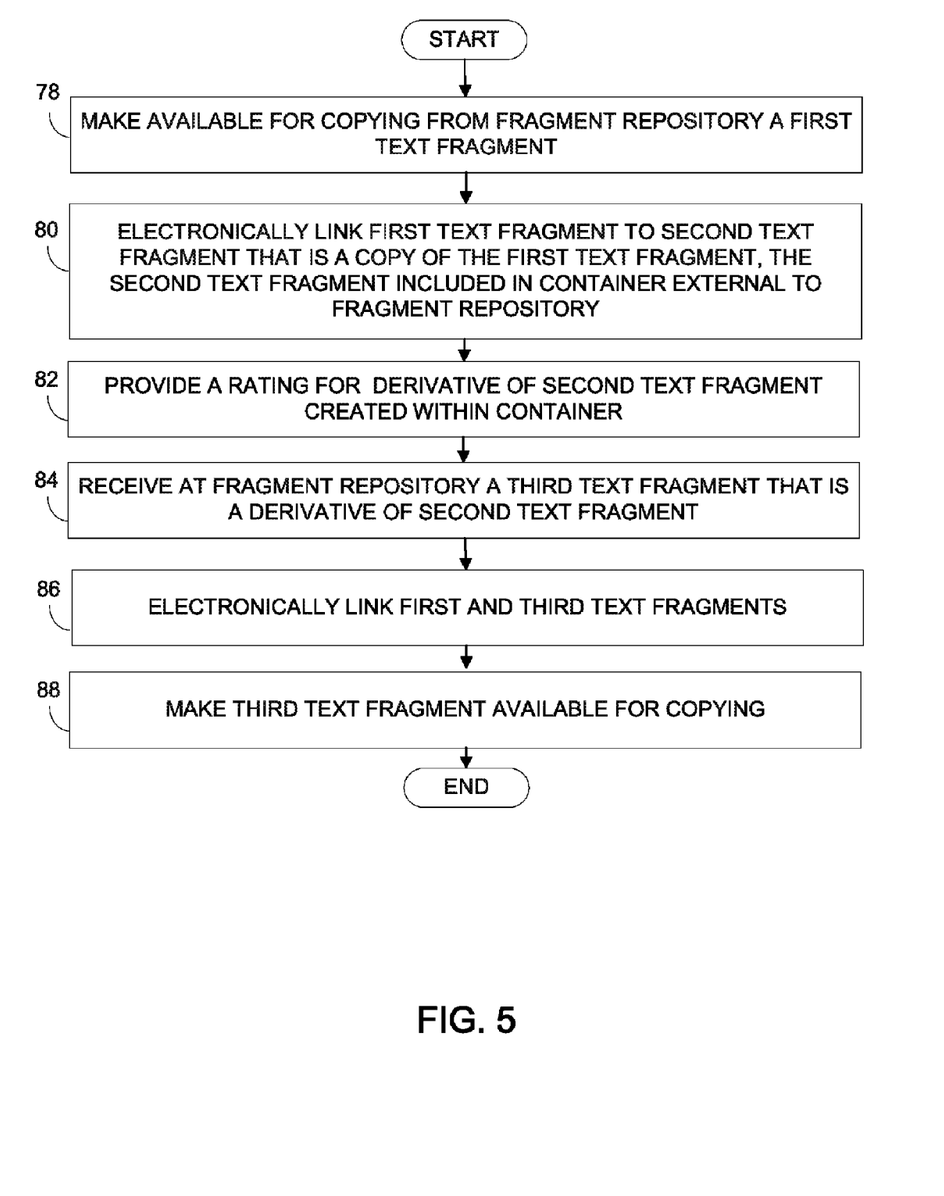
FIGS. 5-6 are flow diagrams depicting steps taken to implement various embodiments.
Figure 6:
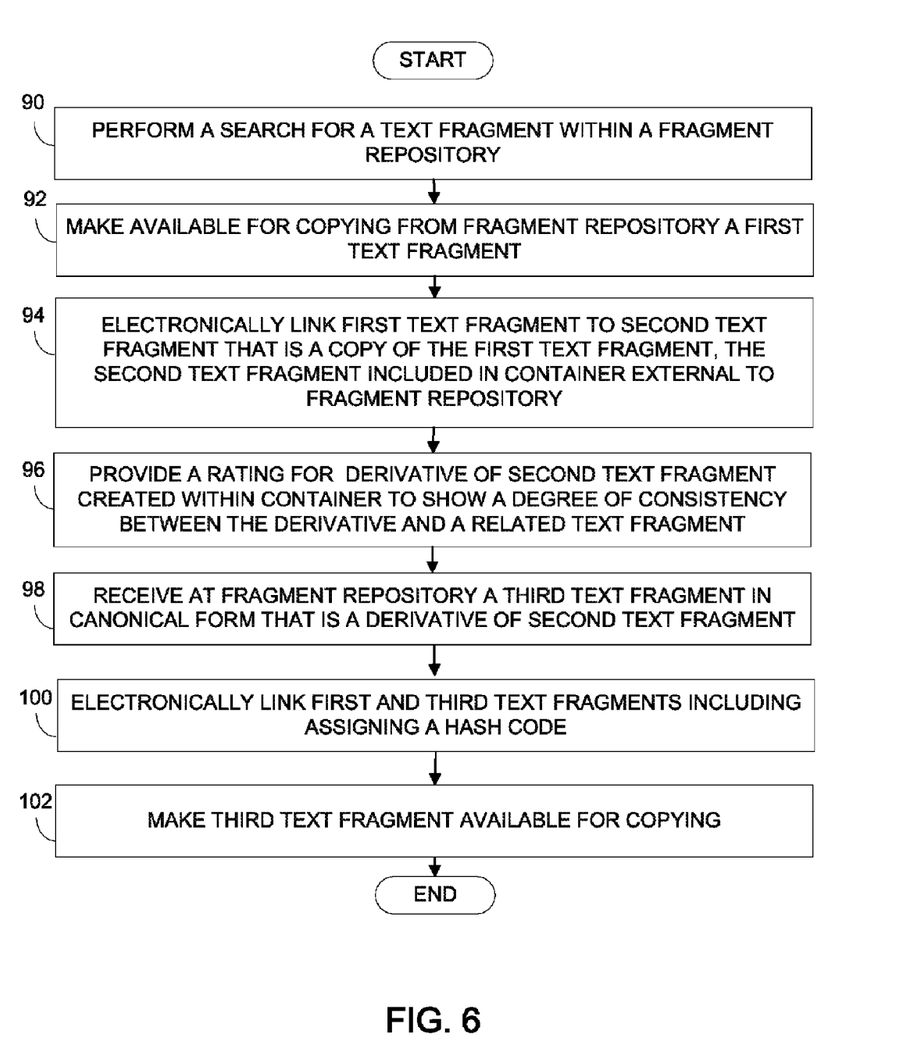

Operation: FIGS. 5 and 6 are example flow diagrams of steps taken to make available, electronically link, receive and rate text fragments, in accordance with an embodiment. In discussing FIGS. 5 and 6, reference may be made to the diagrams of FIGS. 1-4 to provide contextual examples. Implementation, however, is not limited to those examples.

Starting with FIG. 5, a first text fragment is made available for copying from a fragment repository (block 78). Referring back to FIG. 2, the source engine 20 may be responsible for implementing block 78.

Continuing with the flow diagram of FIG. 5, the first text fragment is electronically linked to a second text fragment that is a copy of the first text fragment, the second text fragment included in a container external to the fragment repository (block 80). Referring back to FIG. 2, the source engine 20 may be responsible for implementing block 80.

Continuing with the flow diagram of FIG. 5 a rating is provided for a derivative of the second text fragment created within the container (block 82). Referring back to FIG. 2, the rating engine 22 may be responsible for implementing block 82.

Continuing with the flow diagram of FIG. 5, a third text fragment that is a derivative of the second text fragment is received at the fragment repository (block 84). The first and third text fragments are electronically linked (block 86). The third text fragment is made available for copying (block 88). Referring back to FIG. 2, the publication engine 24 may be responsible for implementing blocks 84, 86 and 88.

Moving on to FIG. 6, in a particular implementation, a search for a text fragment is performed within a fragment repository (block 90). Referring back to FIG. 2, the source engine 20 may be responsible for implementing block 90. A first text fragment is made available for copying from a fragment repository (block 92). Referring back to FIG. 2, the source engine 20 may be responsible for implementing block 92. In an embodiment the fragment repository comprises a memory and text fragments are stored in memory.

Continuing with the flow diagram of FIG. 6, the first text fragment is electronically linked to a second text fragment that is a copy of the first text fragment, the second text fragment included in an electronic document that is open in a container external to the fragment repository (block 94). Referring back to FIG. 2, the source engine 20 may be responsible for implementing block 94. In an embodiment, a container includes an electronic document. In an embodiment, a container includes an editor. In an embodiment, a container includes an electronic document that is open for editing in an editor.

Continuing with the flow diagram of FIG. 6, a rating is provided for a derivative of the second text fragment created within the container to show a degree of consistency between the derivative and a related text fragment (block 96). Referring back to FIG. 2, the rating engine 22 may be responsible for implementing block 96. In an embodiment, the rating shows a degree of consistency between the derivative text fragment and the first text fragment. In an embodiment, the rating shows a degree of consistency between the derivative and the second text fragment. In an embodiment, the rating shows a degree of consistency between the derivative text fragment and a related text fragment that is created in a separate editing session.

Continuing with the flow diagram of FIG. 6, a third text fragment that is a derivative of the second text fragment and that is in canonical form is received at the fragment repository (block 98). The first and third text fragments are electronically linked (block 100). The third text fragment is made available for copying (block 102). Referring back to FIG. 2, the publication engine 24 may be responsible for implementing blocks 98, 100 and 102. In an embodiment, the third text fragment is made available for copying after review by administrator to confirm suitability for copying. In an embodiment, the third text fragment is made available for copying if the fragment receives a rating showing a threshold degree of consistency with a parent or source fragment.

Figure 7:
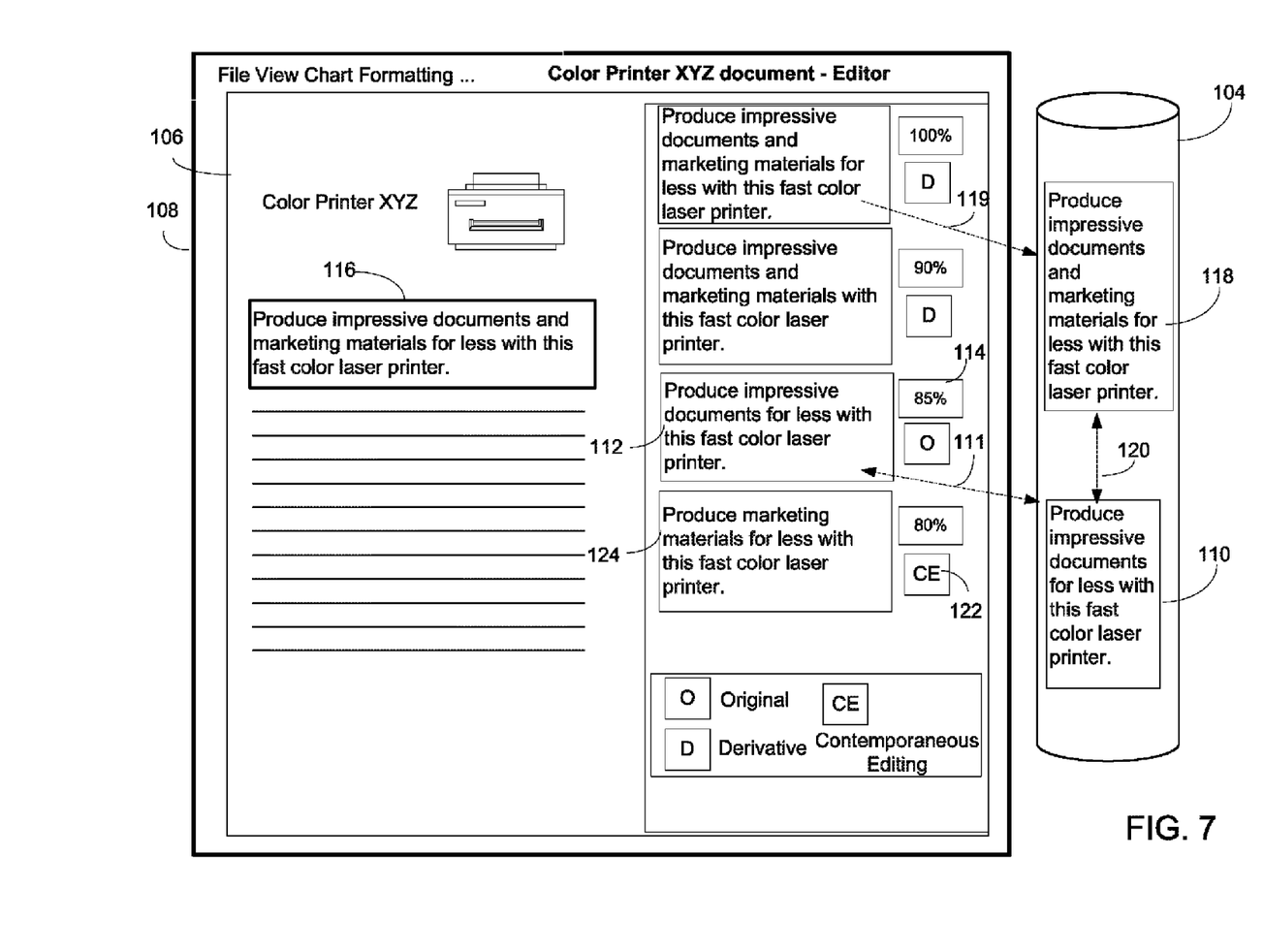
FIG. 7 is an example depiction of making available, electronically linking, receiving and rating text fragments utilizing a fragment repository and a container.

Example: FIG. 7 is an example depiction of making available, electronically linking, receiving and rating text fragments utilizing a fragment repository and a container, according to an embodiment. FIG. 7 illustrates a fragment repository 104, and an electronic document 106 that is open for editing in an editor 108. In this example the electronic document 106 that is open for editing in editor 108 describes a "Color Printer XYZ". A first text fragment 110 that describes Color Printer XYZ is made available for copying from the fragment repository 104. In an embodiment, the fragment repository 104 may comprise a computing device, server or storage device. In an embodiment the fragment repository 104 includes a memory and the first text fragment 110 is stored in memory. In an embodiment, the first text fragment 110 is an original or source fragment that is approved by an administrator or otherwise certified as a permissible or recommended text fragment The first text fragment 110 is electronically linked 111 to a second text fragment 112 that is a copy of the first text fragment 110, the second text fragment 112 included in the editor 108 that is external to the fragment repository 104. In an embodiment, electronically linking text fragments includes assigning a hash code to link the text fragments.

A rating 114 is provided for a derivative 116 of the second text fragment 110, the derivative created within the electronic document 106 open in editor 108. In this example there are four ratings, each of which rating shows a degree of consistency between the derivative text fragment 116 and a related text fragment. Rating 114 shows a degree of consistency between the derivative text fragment 116 and the second text fragment 110.

A third text fragment 118 that is a derivative of the second text fragment 110 is received 119 at the fragment repository 104. The first text fragment 110 and the third text fragment 118 are electronically linked 120, and the third text 118 fragment is made available for copying from the fragment repository 104. In an embodiment, formatting is removed and the third text fragment 118 is converted into a canonical form before it is received at the fragment repository 104. In an embodiment, the third text fragment 118 meets a rating threshold in order to be made available for copying.

In this example, a user is provided with a notice 122 if a related text fragment 124 is revised by another user in a contemporaneous editing session.

Conclusion: The diagram of FIG. 1 is used to depict example environments in which various embodiments may be implemented. Implementation, however, is not so limited. FIGS. 2-4 show the architecture, functionality, and operation of various embodiments. Various components illustrated in FIGS. 2-4 are defined at least in part as programs. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 5-6 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, the method comprising:
   making available for copying from a fragment repository a first text fragment;

electronically linking the first text fragment to a second text fragment that is a copy of the first text fragment, the second text fragment included in a container external to the fragment repository;

providing a rating for a derivative of the second text fragment created within the container;

receiving at the fragment repository a third text fragment that is a derivative of the second text fragment;

electronically linking the first and third text fragments; and making the third text fragment available for copying.

2. The method of claim 1, further comprising searching for text fragments within the fragment repository.

3. The method of claim 1, wherein electronically linking comprises assigning a hash code.

4. The method of claim 1, wherein the container comprises an electronic document.

5. The method of claim 1, wherein the container comprises an editor.

6. The method of claim 1, wherein the rating shows a degree of consistency with a related text fragment.

7. The method of claim 6, further comprising displaying the related text fragment within the container.

8. The method of clai herein the related text fragment comprises the first text fragment.

9. The method of claim 6, wherein the related text fragment comprises the first or the second fragment.

10. The method of claim 6, wherein the related text fragment is created in a separate editing session.

11. The method of claim 1, further comprising converting the third text fragment into a canonical form.

12. The method of claim 1, wherein making the third text fragment available for copying comprises determining that the third text fragment meets a rating threshold.

13. The method of claim 1, further comprising providing a notice to a first user if a related text fragment is revised by a second user in a contemporaneous editing session.

14. A non-transitory computer-readable storage medium containing instructions, the instructions to cause a processor to:

make available for copying from a fragment repository a first ext fragment;

electronically link the first text fragment to a second text fragment that is a copy of the first text fragment, the second text fragment included in a container external to the fragment repository;

provide a rating for a derivative of the second text fragment created within the container;

receive at the fragment repository a third text fragment that is a derivative of the second text fragment;

electronically link the first and third text fragments; and make the third text fragment available for copying.

15. The medium of claim 14, wherein the container comprises an electronic document.

16. The medium of claim 14, wherein the container comprises an editor.

17. The medium of claim 14, wherein the container comprises an electronic document open in an editor interface.

18. The medium of claim 14, wherein the rating shows a degree of consistency with a related text fragment.

19. The medium of claim 18, wherein the related text fragment comprises the first or the second text fragment.

20. A non-transitory computer readable medium storing computer executable instructions to-implement a method, the method comprising:

making available for copying a first text fragment included within a fragment repository;

electronically linking the first text fragment to a second text fragment that is a copy of the first text fragment, the second text fragment included in an electronic document external to the fragment repository;

providing a rating for a derivative of the second text fragment created within an electronic document, the rating showing a degree of consistency with a related text fragment;

receiving at the fragment repository a third text fragment that is a derivative of the second text fragment;

electronically linking the first and third text fragments; and making the third text fragment available for copying.

* * * * *

UNITED STATES PATENT AND TRADEMARK OFFICE
CERTIFICATE OF CORRECTION

PATENT NO. : 8,321,426 B2
APPLICATION NO. : 12/771073
DATED : November 27, 2012
INVENTOR(S) : Russell Perry et al.

Page 1 of 1

It is certified that error appears in the above-identified patent and that said Letters Patent is hereby corrected as shown below:

In column 9, line 24, in Claim 8, delete "clai herein" and insert -- claim 6, wherein --, therefor.

In column 10, line 2, in Claim 14, delete "ext" and insert -- text --, therefor.

In column 10, line 23, in Claim 20, delete "to-implement" and insert -- to implement --, therefor.

Signed and Sealed this
Twelfth Day of March, 2013

Teresa Stanek Rea
*Acting Director of the United States Patent and Trademark Office*